E. B. CRAFT AND J. N. REYNOLDS.

AUTOMATIC TELEPHONE EXCHANGE SYSTEM.

APPLICATION FILED APR. 7, 1919.

Reissued Apr. 25, 1922. 15,341.

3 SHEETS—SHEET 1.

Inventors:
Edward B. Craft.
John N. Reynolds.
by J. S. Roberts Att'y.

E. B. CRAFT AND J. N. REYNOLDS.

AUTOMATIC TELEPHONE EXCHANGE SYSTEM.

APPLICATION FILED APR. 7, 1919.

Reissued Apr. 25, 1922.

15,341.

3 SHEETS—SHEET 2.

Inventors:
Edward B. Craft.
John N. Reynolds.
by J. E. Roberts Att'y.

E. B. CRAFT AND J. N. REYNOLDS.
AUTOMATIC TELEPHONE EXCHANGE SYSTEM.
APPLICATION FILED APR. 7, 1919.
Reissued Apr. 25, 1922.
15,341.
3 SHEETS—SHEET 3.
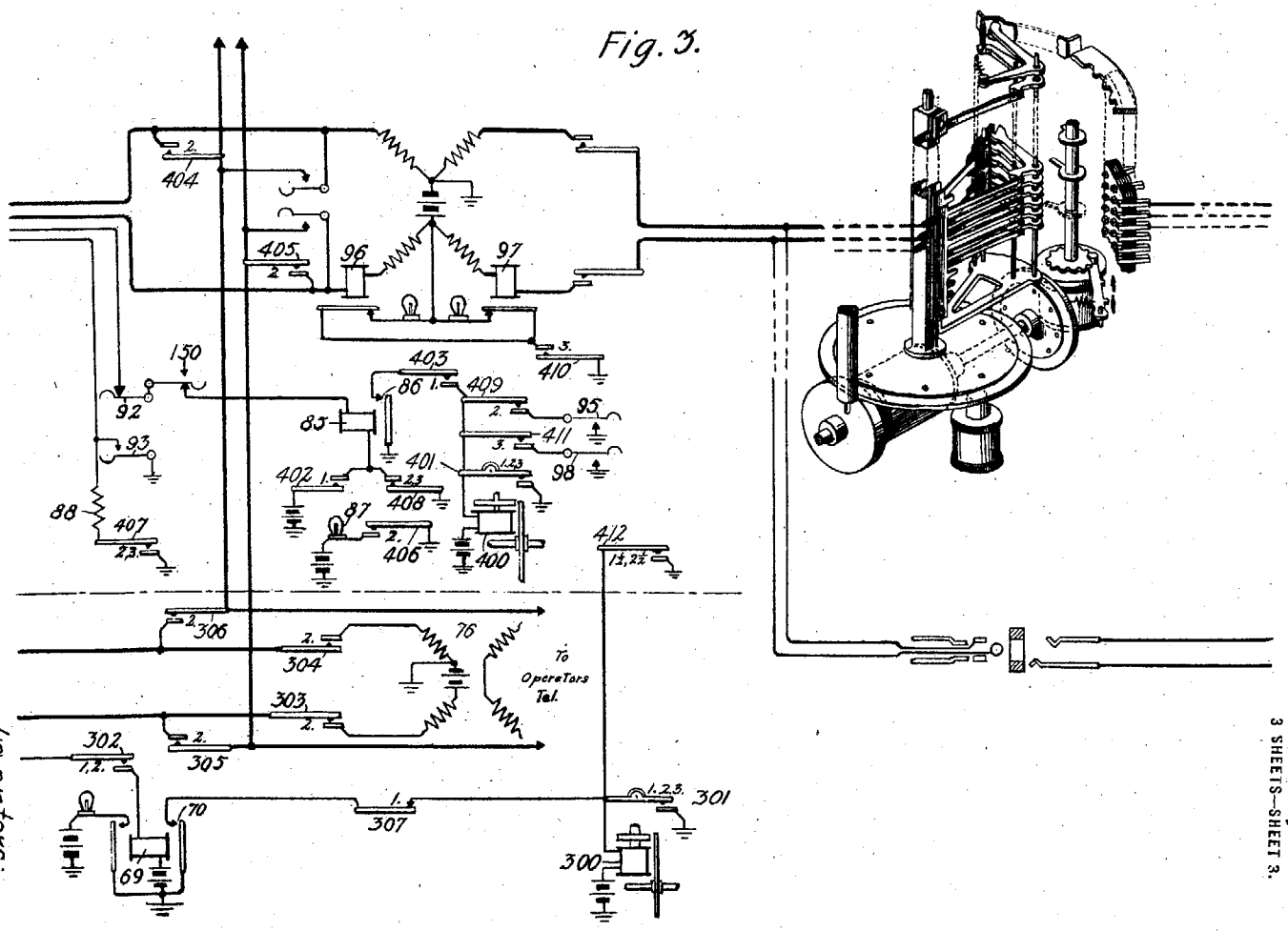
Inventors:
Edward B. Craft.
John N. Reynolds.
by J. E. Roberts Att'y.

UNITED STATES PATENT OFFICE.

EDWARD B. CRAFT, OF HACKENSACK, NEW JERSEY, AND JOHN NEWBERRY REYNOLDS, OF GREENWICH, CONNECTICUT, ASSIGNORS, BY MESNE ASSIGNMENTS, TO WESTERN ELECTRIC COMPANY, INCORPORATED, OF NEW YORK, N. Y., A CORPORATION OF NEW YORK.

AUTOMATIC TELEPHONE EXCHANGE SYSTEM.

15,341. Specification of Reissued Letters Patent. Reissued Apr. 25, 1922.

Original No. 1,267,980, dated May 28, 1918, Serial No. 878,047, filed December 19, 1914. Application for reissue filed April 7, 1919. Serial No. 288,403.

*To all whom it may concern:*

Be it known that we, EDWARD B. CRAFT and JOHN N. REYNOLDS, citizens of the United States, residing at Hackensack, in the county of Bergen and State of New Jersey, and at Greenwich, in the county of Fairfield and State of Connecticut, respectively, have invented certain new and useful Improvements in Automatic Telephone-Exchange Systems, of which the following is a full, clear, concise, and exact description.

This invention, in some respects, relates to telephone exchange systems generally, but it is applicable more particularly to systems employing automatic switches for distributing calls to connecting circuits of operators' positions.

In one respect its object is to adapt an automatic switch of a type having multiple connected brushes for use as a quick-acting line or trunk finder, and to this end the brush selecting mechanism of the switch is adapted for adjustment in accordance with the group in which the terminal of a selectable line or trunk lines, and the brush carrier element is adjusted in accordance with the location of the terminal in that group.

In another respect its object is to gain time in extending a connection to a call receiving device, such as an operator's telephone. The invention in this respect is especially applicable to a call distributing system, wherein a two-movement automatic switching mechanism operates first to find an idle operator's position and then to find an idle connecting circuit in that position. As thus applied it provides for the connection of the operator's set to the line calling in the first switching movement.

In another respect, applicable to automatic switching systems in telephone exchanges generally, its object is to provide easily manipulated and simple mechanism for identifying engaged lines. To this end each line is provided with identifying means operating over connections preferably established by the automatic switching apparatus from any operator's position.

In another respect, its object is to provide simple means for effecting a number of different identifications of a line. To this end, each line has associated with it means for identifying it to the finder switch as a calling line, and means for identifying it to the operator as a particular calling line. This is done over a path that is used for one identification at one time and for another identification at another time.

In another respect, applicable to systems for distributing calls to operators' positions or to systems in which lines are connected through automatic switches in series, its object is to enable the operator to render a connected line available for other connections while continuing the connection already established. To this end preferably the circuit of a cut-off relay for the line is extended to the operator's position, a key being provided for controlling that circuit.

These and other features of this invention will be more fully considered in the following description of a call distributing system with reference to the attached drawings, in which—

Fig. 3 illustrates the operator's listening circuit, the operator's connecting circuit and the associated controlling apparatus.

Figure 1:
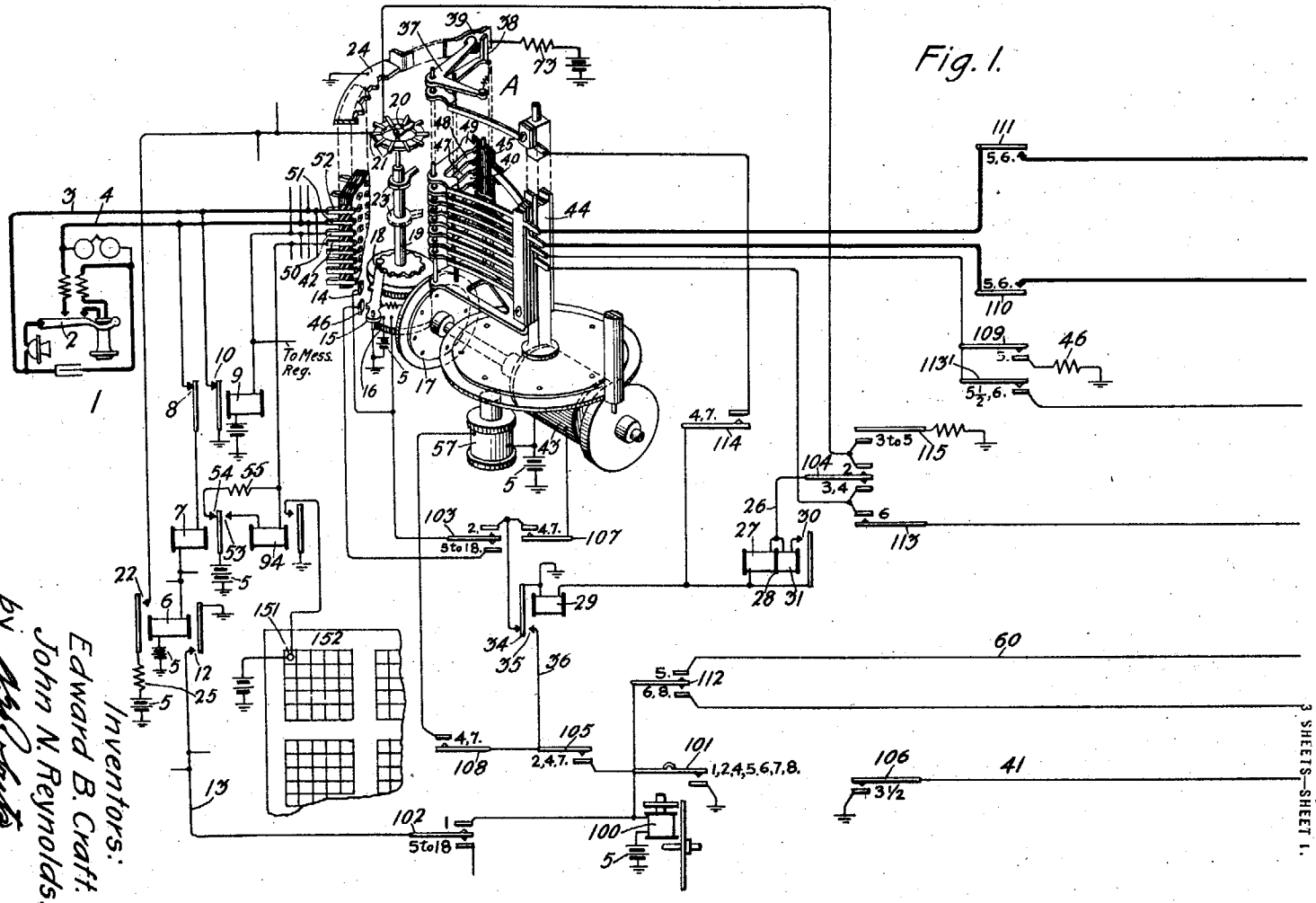
Figure 1 illustrates the calling subscriber's line, the line finder and the associated controlling apparatus.

The calling subscriber's station 1 of Fig. 1 is provided with the usual switch hook 2 for closing the circuit of the line conductors 3 and 4. When this circuit is closed on the initiation of a call, current flows from battery 5 through relay 6 which is common to a group of lines terminating on the contact points which constitute one level in a group of line finder switches, through line relay 7, contact 8 of cutoff relay 9, line conductor 4, switch hook 2, line conductor 3 and contact 10 of cutoff relay 9, to earth. The current in this path actuates group relay 6 and line relay 7. The actuation of relay 6 closes its contact 12, thus completing a circuit from earth, through conductor 13 which is common to contact points similar to 12 on all of the group relays 6 associated with the subscribers' lines terminating in one group of line finder switches, through sequence switch contact 102—1 and through sequence switch operating magnet 100 to battery 5 and earth.

Sequence switch 100 and sequence switches 200, 300 and 400 may be similar to that illustrated in patent to F. R. McBerty, No. 1,009,080 dated November 21, 1911, or of any other suitable type.

Switch 100 controls sequence switch contacts 101, et seq. Contact 101 of sequence switch 100 is arranged to close the local circuit for the sequence switch operating magnet in all positions of the switch except those indicated by the figures adjacent to contact 101. This provides that the switch may stop only in the positions indicated. The other sequence switch contacts 102, et seq., are closed only in the positions indicated by the figures adjacent to the respective contacts.

The current flowing through conductor 13, sequence switch contact 102—1 and the operating magnet of sequence switch 100 causes the movement of the sequence switch from its first to its second position. In this position a circuit is completed from battery 5 through clutch magnet 16 of the group finding brush trip shaft 19 associated with line finder switch A, contact 103—2, contact 34 of relay 29, to earth. This brings the driving disk 17 into frictional engagement with the shaft disk 18 and causes the shaft 19 to rotate in a counter clockwise direction. The upper end of shaft 19 carries the brush 20 which, in its rotation, wipes over the group contact points 21. These contact points are normally disconnected from battery, but upon the actuation of group relay 6, a particular one of the contact points 21, corresponding to the level of contact points in which the calling subscriber's line terminates, has battery potential connected to it through contact 22 of relay 6. When the shaft 19 is rotated to the position at which brush 20 engages contact point 21 of the level including the calling subscriber's line, a path is completed from battery 5 through the non-inductive resistance 25, contact 22 of relay 6, contact and brush 21 and 20, sequence switch contact 104—2, conductor 26, winding 27 of test relay 28 and the coil of test relay 29, to ground. The current in this path actuates relay 28, closing a low resistance path through its contact 30 and winding 31, and actuates relay 29. The actuation of relay 29 severs its normal contact 34, thus interrupting the current through clutch magnet 16 and stopping the rotation of shaft 19.

Located at equal intervals along shaft 19 are brush tripping fingers 23, angularly disposed with respect to one another, and equal in number to contact points 21. The function of each finger 23 is to release a particular set of brushes 40, 47, 48 and 49, corresponding to the contact level of switch A in which the calling line terminates. The degree of rotation necessary to bring the desired tripping finger 23 into operating position is determined by the selection of the contact point 21 by brush 20, as described above. To prevent the rotation of shaft 19 from stopping the instant that brush 20 comes in contact with the point 21 and before it is accurately centered thereon, said shaft carries a toothed wheel 11 whose function it is to force arm 15 into intermittent contact with spring 14, thereby closing a local circuit for magnet 16 during the interval in which brush 20 is passing from one point 21 to another. The rotation of shaft 19 therefore ceases only when brush 20 completely covers the contact point 21 to be selected. Upon the actuation of relay 29, contact 35 is closed and a circuit is completed from ground, through contact 35, conductor 36, sequence switch contact 105—2 and the operating magnet of sequence switch 100 to battery 5. Current in this path causes the sequence switch 100 to move to its third position. In moving out of the second position, sequence switch contact 104—2 is opened, thus interrupting the circuit of test relays 28 and 29. In the third position of sequence contact 115—3 is closed thereby placing busy potential on the contact point 21 which has been selected. The circuit of relays 28 and 29 is now connected through sequence switch contact 104—3 to brush 40, which brush being in its normal position, does not as yet complete a circuit for the test relays 28 and 29. In the third position of sequence switch 100, contact 101 is closed. This maintains a local circuit for the operating magnet 100, and the sequence switch does not therefore stop in position 3, but is advanced to and stops next in position 4.

During the latter half of the movement of the sequence switch out of position 3 contact 106—3½ is closed, thus sending an impulse over conductor 41 to start the operator finder sequence switch 200 of Fig. 2, the operation of which will be hereinafter described.

In the fourth position of the sequence switch 100, circuit is completed from battery 5 through the brush operating magnet 43, sequence switch contact 107—4 and back contact 34 of relay 29, to ground. Current in this path actuates clutch magnet 43, causing the brush carriage shaft 44 to rotate in counter-clockwise direction. As the shaft 44 starts to rotate, one of the insulating blocks 45 is engaged by one of the brush tripping fingers on shaft 19, causing the four brushes 40, 47, 48 and 49 to be released and to drag over the contact points of the various line terminals in the particular group or level of the line finder switch in which the calling line is located. When the brushes in their travel engage contact points 42, 50, 51 and 52 of the calling line, a circuit is completed from battery 5 through contact 54 of the line relay 7 non-inductive resistance 55, contact point 42, and brush 40, sequence switch contact 104—4, conductor 26, high resistance coil 27 of test relay 28, and the coil of test relay 29 to ground. Relay 29 is, however, short-circuited at this time by a path to ground through contact 114—4, contact arm 38, and track 24 to ground. This path is open only when roller 37 is positioned in a depression in track 24, which occurs only when the brushes 40, 47, 48 and 49 are centered on a set of line contacts. Test relay 28 is energized thereby closing contact 30 and shunting the high resistance winding 27 by the low resistance winding 31. This reduces the test potential on contact 42, so that the subscriber's line in question, cannot be selected by another switch of the group in which it terminates. When the switch brushes are centered on the contacts of the calling line, the path to ground through roller 37 opens and relay 29 operates thereby opening the circuit of clutch magnet 43, thus stopping the rotation of the shaft 44 and leaving the brushes 40, 47, 48 and 49 in engagement with the contact points 42, 50, 51 and 52 of the calling line. The operation of test relay 29 closes contact 35, thus completing a circuit from ground, through conductor 36, sequence switch contact 108—4 on the coil of holding magnet 57, to battery. The function of the holding magnet 57 is to prevent the inertia of the clutch disk of the brush carriage from carrying the brushes beyond the desired position. Contact 35 of relay 29 also now completes a circuit through conductor 36, sequence switch contact 105—4 and the operating magnet of sequence switch 100 to battery 5, thus moving the sequence switch out of its fourth and into its fifth position. In this position a circuit is closed from ground through sequence switch contact 109—5, resistance 46, brush 47, contact 50 of the line finder and the coil of cut-off relay 9 to battery. This operates the cut-off relay and opens the circuit of group relay 6 and line relay 7. The potential of contact 50 is thus altered this change in potential providing the busy test potential for the multiple contacts of the calling line which may extend either to multiple jacks at a manual board or to terminals of automatic connector switches.

Sequence switch contact 103—5 is now closed, thus completing a local circuit for trip-shaft operating magnet 16 by way of the contact between spring 46 and arm 15, which contact is closed for all positions of the shaft 19 except the normal position. Shaft 19 will thus be returned to normal.

In the fifth position of sequence switch 100 the lever of contact 102, which has been standing in an intermediate position since the first position of the sequence switch, is moved to its lower position in which it completes connection with conductor 58 which extends through a conductor similar to 13 and through another set of sequence switch contacts similar to 102, to the sequence switch magnet of another line finder. This second line finder will be operated in the same manner as the one described, providing a second call is initiated during the use of the first line finder. This series of sequence switch contacts is carried out through the entire group of line finder switches assigned to the particular group of subscribers' lines, the number of switches depending upon the number of simultaneous calls which may be desired from a given group of subscribers' lines.

Figure 2:
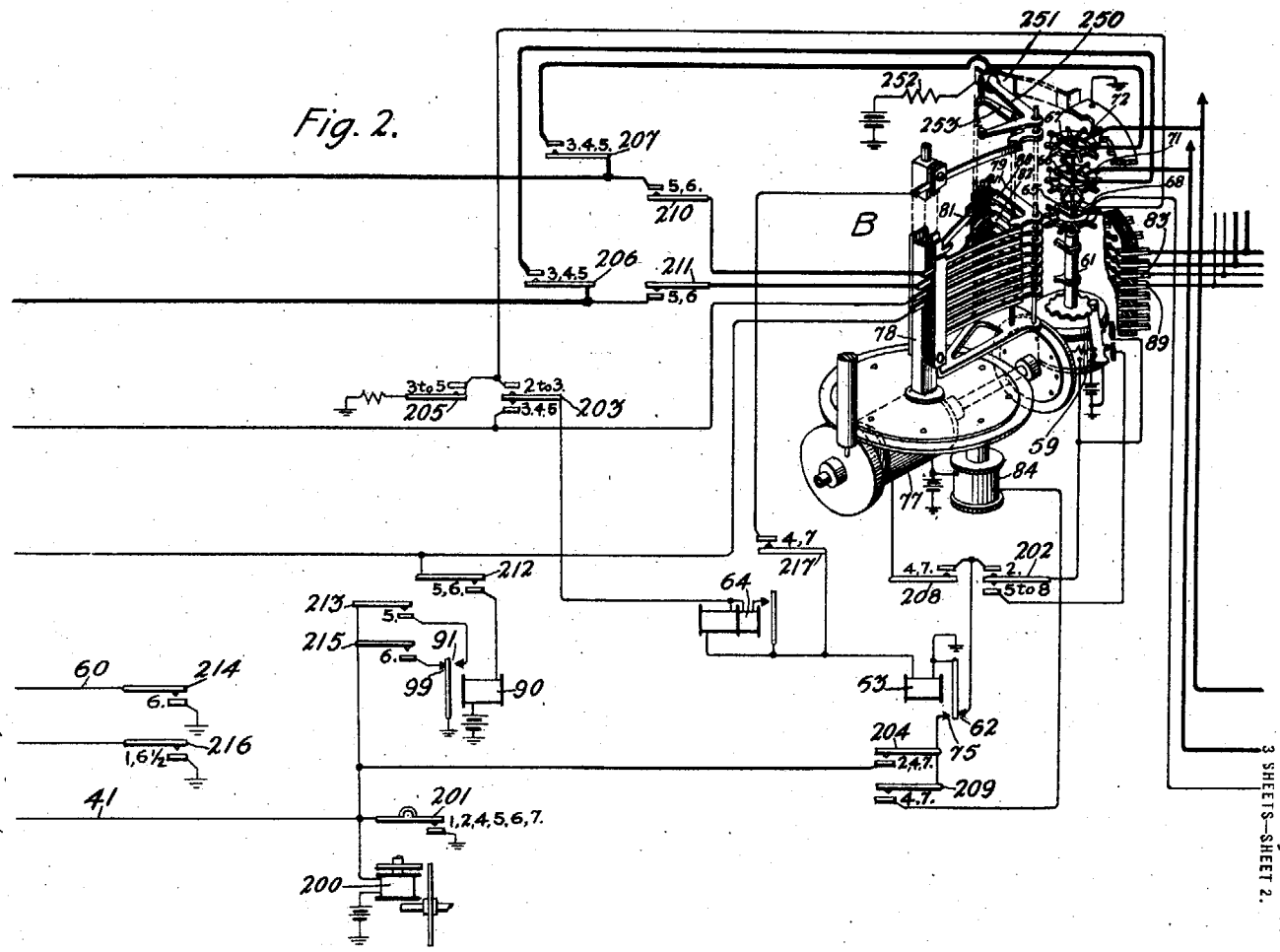
Fig. 2 illustrates the operator's position at the finder and connecting finder with their associated controlling apparatus.

In the fifth position of sequence switch 100, contacts 110 and 111 are closed, extending the line conductors to the operator finder switch B of Fig. 2.

The next step of the line finder sequence switch 100 is dependent upon an impulse which will be received over conductor 60 from sequence switch 200 of Fig. 2, through sequence switch contacts 112—5. It is therefore now advisable to trace the operation of the operator's finder switch up to the point at which it gives the impulse over conductor 60 for moving the sequence switch 100 out of its fifth position.

As previously described, sequence switch contact 106—3½ Fig. 1, completes a circuit over conductor 41 through the operating magnet of sequence switch 200, Fig. 2, to battery and ground. The actuation of this magnet causes sequence switch 200 to move to its second position. In this position, a circuit is completed from battery through the coil of brush trip operating magnet 59, sequence switch contact 202—2, and contact 62 of test relay 63 to ground. Current in this path actuates the clutch magnet 59 causing the rotation of the brush trip shaft 61, after the manner described in connection with Fig. 1. Carried at the top of the shaft 61 are the three brushes 65, 66 and 67 which wipe over contact points connected with various operators' listening and talking circuits. These circuits when idle, will have battery potential on contact points 68, so that the arrival of the brush 65 upon such a contact point completes a circuit through the coil of test relay 63, the coil of locking relay 64, sequence switch contact 203—2, brush 65, contact 68, sequence switch contact 302—1 of Fig. 3, and the coil of signal relay 69 to battery and ground. Current in this path actuates relays 63 and 64. Relay 69 is also actuated, thereby closing the circuit from ground through contact 70, sequence switch contact 307—1, operating magnet of sequence switch 300, to battery and advancing this switch to its second position.

The actuation of relay 63 opens its contact 62, and opens the circuit of the brush trip operating magnet 59, thus stopping the rotation of the brushes 65, 66 and 67 upon contact points 68, 71 and 72. The actuation of test relay 63 also closes its contact 75 which completes a circuit through sequence switch contacts 204—2 and the coil of sequence switch operating magnet 200 to battery. This causes the sequence switch to move out of its second and into its third position. In this position, sequence switch contact 205—3 is closed, placing a ground potential upon brush 65 and contact point 68 to maintain the actuation of relay 69 and to furnish a busy test potential to prevent other operator finder switches from connecting with this particular operator's listening and talking circuit during its use. Sequence switch contacts 206—3 and 207—3 are closed at this time, thus connecting the calling subscriber's line through brushes 66 and 67 and contact points 71 and 72 with one winding of the operator's repeating coil 76, the middle terminals of this winding being connected to the opposite poles of a battery to furnish current for the calling subscriber's transmitter through sequence switch contacts 303—2 and 304—2. The operator is thus connected conversationally with the calling subscriber through sequence switch contact 305—2 and 306—2, even before an idle connecting circuit at the operator's position has been selected, thus enabling the operator to obtain the number of the desired line, while the automatic selection of the connecting circuit is proceeding.

Sequence switch 200 does not stop in its third position, but proceeds immediately to its fourth position by reason of the closure of contact 201 during the third position. In position 4, sequence switch contact 208 is closed and a circuit is completed for the brush clutch magnet 77 from battery through the coil of said magnet, sequence switch contact 208—4 and contact of test relay 63 to ground. This causes the rotation of the brush carrying shaft 78 in a clockwise direction, the particular set of brushes tripped during the movement by a particular finger upon shaft 61, after the manner described in connection with switch A. As these brushes 79, 80, 81 and 82 wipe over the contact points on which various cord circuits terminate, a circuit through test relay 63 is again completed through the various test contacts of the cord circuits until an idle cord is reached. As will be hereinafter explained, the test contact points 83 of all idle connecting circuits will have battery potential thereon. A circuit will, therefore, be completed from said contact point 83, through test brush 81, sequence switch contact 203—4, one coil of relay 64 and the winding of test relay 63 to ground. When the brushes first engage the connecting circuit contacts, relay 63 will be short-circuited by a path to ground through contact 217—4, brush 253 and the interrupted track to ground, as described in connection with switch A. However, relay 64 will be energized, and by attracting its armature, will include its low-resistance right winding in parallel with its high-resistance left winding, thus providing a low-resistance path to ground from the contact engaged by test brush 81, and causing the multiples of that contact to test busy. When the switch brushes are centrally positioned on the contacts of the selected connecting circuit, the path to ground through the interrupter will be opened, thus actuating test relay 63. The actuation of relay 63 opens its contact 62, thus deënergizing the clutch magnet 77. The closure of contact 75 of relay 63 completes a circuit through sequence switch contact 209—4 and the winding of holding magnet 84 which on actuating, stops the brushes 79, 80, 81 and 82 in contact with the stationary terminals of the connecting circuit. The closure of contact 75 of relay 63 also completes a circuit through sequence switch contact 204—4, and through the winding of sequence switch operating magnet 200 to move the sequence switch out of its fourth and into its fifth position. Sequence switch contact 202—5 is now closed, thus completing a local circuit for trip shaft operating magnet 59 and returning shaft 61 to normal after the manner described in connection with switch A. In this position of the sequence switch, contacts 210—5 and 211—5 are closed, completing the circuit of the calling line through brushes 79 and 80 to the talking strands of the connecting circuit.

Upon the arrival of test brush 81, upon stationary contact point 83, a circuit is completed from battery through sequence switch contact 402—1, and the coil of relay 85, key contact 92, sequence switch contact 203—5, relays 64 and 63, to ground. Current through this circuit causes relay 85 to actuate, completing a circuit through its contact 86, sequence switch contact 403—1, and the coil of sequence switch operating magnet 400 to battery. This causes sequence switch 400 to move to its second position in which contacts 402 and 403 are opened. In this position contacts 404 and 405 are closed to connect the operator's set directly with the talking conductors of the connecting circuit.

Sequence switch 400 in passing from position 1 to position 2 momentarily closes contact 412—1½, thus completing a circuit for sequence switch motor magnet 300 and causing the sequence switch to move from position 2 to position 3. Contact 302 is now open and no other calls can come into the operator's position.

In the second position of sequence switch 400 contact 406—2 is closed, completing the circuit of the connecting circuit indicating lamp 87 which indicates to the operator which of the particular connecting circuits at her position has been selected. In this position also, sequence switch contact 407—2 is closed, completing a circuit through non-inductive resistance 88, contact point 89 and brush 82, through selector switch sequence switch contact 212—5, and the coil of the release control relay 90 to battery and ground. Current in the path just described actuates relay 90, closing its contact 91 to complete a circuit through sequence switch contact 213—5, and the coil of sequence switch operating magnet 200 to battery, thus moving the sequence switch 200 out of its fifth and into its sixth position. In moving out of the fifth position, contacts 206 and 207 are interrupted, disconnecting the brushes of the operator's positon finder from the talking circuit. In position 6 of sequence switch 200 contact 214—6 is closed, thus completing circuit through conductor 60, sequence switch contact 112—5 and the coil of sequence switch operating magnet 100 to battery. This causes the sequence switch 100 to move out of its fifth and into its sixth position. When sequence switch 100 leaves its fifth position, contact 109 is opened and contact 113′—6 is closed, thus shifting the control of the cutoff relay 9 from the line finder switch to the operator's connector circuit, circuit being now maintained through brush 81, contact 83, series of contacts of cutoff relay release key 92, the coil of relay 85 and sequence switch contact 408—2 to ground. Position 6 of sequence switch 100 being the talking position, this switch is not again actuated until the release is desired.

In order that the operator may determine the number of the line which is calling, a bank of lamps 152 or a plurality of banks of lamps is located in easy sight of the operator, these lamps being arranged in definite order, so that the number of any lamp which is displayed or flashed, may be readily determined from a distance. It is not always necessary for the operator to determine the number of the calling subscriber's line, or to verify a subscriber's statement of his line number, but in order that this may be done when necessary, means are provided whereby the operator may flash the lamp 151 of the call subscriber in the bank or banks. For this purpose the line lamp flashing key 93 is provided, which when actuated, completes a low resistance circuit through contact 89, 82 of the connecting circuit finder, contact 113—6, brush 40 and contact point 42 of the line finder switch and the coil of relay 94 to battery and ground through the back contact 53 of line relay 7. The current in this path actuates relay 94 which completes the circuit of the line number lamp 151 whereby the lamp may be flashed in synchronism with the actuation of the operator's line lamp flashing key 93.

The circuit completed in the finder switch contacts 42 and 40, and the hranches of this circuit with their included devices, act to effect two identifications of any line the terminals of which are engaged by the finder switch. The branch that is closed by way of the resistance 55 when the line relay 7 is energized, cooperates with the branch that is closed by way of the test relays 28 and 29 to identify the line as a calling line and stop the brushes of the line finder switch in engagement with the corresponding line terminals. The branch including the relay 94 that is closed when the line relay 7 is inert, cooperates with the branch including the flashing key 93 to identify the line to the operator as a particular one of the lines which she serves.

Furthermore, by adjusting the electrical values of the branches and the devices included in them, each branch is adapted to cooperate only with its corresponding branch. To provide the margin that determines the operation or non-operation of the test relay 27, relay 94 in the normally closed branch of the conductor extending to switch terminal 42 may have a resistance of 1000 ohms, while the coil 55 included in the alternate branch of the conductor may have a resistance of 100 ohms. The margin that determines the operation or non-operation of the relay 94 is obtained by making the normal path through the windings of the test relays 28 and 29 of high resistance by including a resistance 88 of, say, 400 ohms in the extension of the conductor by way of the finder switch B, and by arranging the flashing key 93 to connect the conductor directly to ground. The adjustments of the relays are such that the test relay 27 is actuated only when a line is encountered with its relatively low resistance branch closed by way of the front contact of the line relay 7; and so that the relay 94 is actuated only when a low resistance path for the flow of current through it is closed by the operation of the flashing key 93.

After the operator has terminated her conversation with the calling subscriber and has taken the first step toward securing connection with the desired subscriber's line, which may be either by means of automatic switches or a plug and jack, she depresses her listening cutoff key 95, which closes a circuit through sequence switch contact 409—2, and through the coil of sequence switch operating magnet 400 to battery. This causes sequence switch 400 to move out of its second and into its third or talking position. In this position, contacts 404 and 405 are opened, thus disconnecting the operator's talking and listening set of the connecting circuit. As switch 400 passes from position 2 to position 3 the circuit through the motor magnet of operator's listening sequence switch 300 is momentarily closed through sequence switch contact 412—2½ and the switch returned to normal. The contact point 68 is thus again rendered selectable so that the operator's position will test idle, and so that another call may be received by this operator at any one of her connecting circuits.

It is not deemed necessary to illustrate in detail the means for establishing an automatic connection or a manual connection with a desired line. It is to be understood, however, that when such a connection is established, the coil of supervisory relay 96 is serially included in the calling telephone line and the coil of supervisory relay 97 is serially included in the called telephone line, current being fed to the transmitters of the respective substations from the central source of current through these coils. At the termination of a conversation, the subscribers replace their receivers upon their switch-hooks, and thus allow relays 96 and 97 to return to their normal positions, and complete the circuits of the disconnect supervisory lamps in the usual way, through sequence switch contact 410—3. When the operator observes the display of both the calling and answering disconnect lamps, she depresses her clearing out key 98, which completes a circuit through sequence switch contact 411—3, and through the coil of sequence switch operating magnet 400 to battery and ground. This causes sequence switch 400 to move out of its third and into its first or normal position. As this occurs, sequence switch contact 410 is interrupted, thus extinguishing the disconnect lamps. Contact 407 is now interrupted and the holding circuit of release relay 90 thereby opened, allowing its armature to return to its normal position, closing contact 99 and completing a circuit from ground through contact 99, sequence switch contact 215—6 and the coil of operating magnet 200 to battery and ground. Current in this path actuates the sequence switch 200, causing it to move out of its sixth, and into its seventh position. Between the sixth and the seventh position of sequence switch 200, contact 216 is momentarily closed, sending an impulse of current through contact 112—6, and the coil of sequence switch operating magnet 100 to battery and ground. Current in this path causes the sequence switch 100 to move out of its sixth and into its seventh position.

In the seventh position of sequence switch 200 a circuit is closed for brush shaft operating magnet 77 from battery through sequence switch contact 208—7, and contact 62 of relay 63 to ground. This causes the brush shaft to rotate until track brush 250 comes in contact with plate 251, when a circuit is completed from battery through resistance 252, track 251, track brush 250, contact arm 253, sequence switch contact 217—7 and relay 63 to ground. This causes relay 63 to operate, opening the circuit of magnet 77 at contact 62 and closing a circuit for holding magnet 84 by way of sequence switch contact 209—7 and contact 75 of relay 63. The closure of contact 75 also completes a circuit from ground through sequence switch contact 204—7 and sequence switch operating magnet 200 to battery, causing this switch to return to its normal or first position.

In the seventh position of sequence switch 100 a circuit is completed from battery through the coil of the brush operating magnet 43, contact 107—7, and contact 34 of relay 29 to ground. Current in this path actuates magnet 43, causing the brush carrying shaft 44 to rotate again in a clockwise direction. The rotation of this shaft will continue until the track brush 37 engages the plate 39, at which time a circuit is completed from battery through the resistance 73, plate 39, brush 37, contact arm 38, sequence switch contact 114—7, and the coil of relay 29 to earth. Current in this path interrupts the circuit of clutch magnet 43 at contact 34 of relay 29, and closes the circuit for holding magnet 57 through contact 35 of relay 29 and the sequence switch contact 108—7.

The actuation of relay 29 also completes a circuit through contact 35, sequence switch contact 105—7, and the coil of sequence switch operating magnet 100 to battery. This causes the sequence switch to step to its eighth position, in which contact 114 is interrupted, permitting relay 29 to return to normal and in which contact 107 is interrupted to prevent the brush carrying shaft 44 from being carried beyond its normal position. Contacts 105 and 108 are also opened at this time, the separation of contact 108 releasing the holding magnet, which now has no purpose. If sequence switch 200 has by this time returned to its normal position, a circuit is now completed through contact 216—1, contact 112—8, and the coil of sequence switch operating magnet 100 to battery. Current in this path actuates the sequence switch 100, causing it to move out of its eighth and into its first or normal position, at the same time opening its contact 112. As sequence switch 100 returns to its normal position, contact 102—1 is closed, so that another call, may be received by this line finder switch.

It sometimes occurs that an operator will for some reason wish to hold the connection between a calling subscriber's line and one of her connecting circuits, for the purpose of, for example, notifying the calling subscriber when a subscriber's line which tests busy, becomes available. During this time it is not desired that the calling subscriber's line shall, be rendered available to other desiring connection therewith. The connecting operator is therefore provided with cutoff release key 92, which when actuated, severs the holding circuit for the cutoff relay 9 and at the same time removes the busy potential from the contact point 50 and its multiple contact points, which may be either the test contact points of multiple jacks or the test contact points of an automatic connector switch. The operator's position is also provided with a key 150, which when actuated, connects a source of current of a particular strength or character to actuate a message register.

In case the operator decides to hold the connection in the above described manner, she will instruct the calling subscriber to refrain from initiating new calls until he is notified by her that the desired line became available. If, notwithstanding these instructions, the calling subscriber does initiate a new call, then, due to the energization of relay 96, the answering supervisory lamp at the operator's position will be extinguished, whereupon the operator can sever the connection that has been held by actuating her key 98. Before thus severing the connection, the operator will preferably first actuate her manual listening in key (Fig. 3) to ascertain whether the subscriber has initiated a new call, or whether he has removed his receiver from the switchhook in answering a call. Before signaling the calling subscriber that the called line became available, the operator may actuate her manual listening in key to ascertain whether the calling subscriber is engaged in a conversation. It should be noted that the resistances of the repeating coil and relay 96 (Fig. 3) are of such value that ringing current applied to the calling line while a connection is being held will not be diverted to an extent that would interfere with the proper operation of the bell at the subscriber's station.

While this invention is shown and described with reference to a particular embodiment, obviously it is susceptible of many modifications without departing from its spirit or scope.

What is claimed is:

1. In a telephone exchange system, the combination with lines, and a line selector having terminals for said lines arranged in groups, a plurality of multiply connected brushes one for each group, a brush carrier and brush selector mechanism of means for rendering any of said lines selectable, and means for starting and operating said line selector to connect with a selectable line by adjustment of said brush selector mechanism in accordance with the group in which the terminal of said selectable line lies and adjustment of said brush carrier in accordance with the location of said terminal in that group.

2. In a telephone exchange system, the combination with lines and a line selector having line terminals arranged in coordinate groups, a plurality of brushes connected in multiple, a brush carrier and a brush selector, of means for rendering any of said terminals selectable, and means for starting and automatically operating said line selector by adjustment of said brush selector and said brush carrier, respectively, in accordance with the location of a selectable terminal in said coordinate groups.

3. In a telephone exchange system, the combination with a plurality of lines arranged in groups and a brush carrier having a plurality of multiply connected sets of brushes, of a brush selector, a contact member carried by said brush selector, contact points, one for each of said line groups adapted for cooperating with said member, and means operable by a calling line for rendering one of said contact points selectable and means for starting and for adjusting said brush selector in accordance with the position of said selectable contact point.

4. In a telephone exchange system, the combination with a line selector having terminals arranged in groups, said selector being adjustable in successive movements to connect with any terminal, of a call receiving device for each of said groups, means for rendering any of said terminals selectable, and means for operating said selector in its first movement to find a group containing a selectable terminal and thereupon to connect with said call receiving device and in its second movement to find a selectable terminal in that group.

5. In a telephone exchange system, the combination with a line selector having terminals arranged in groups, said selector being adjustable in successive movements to connect with any terminal, of a call receiving device for each of said groups, means for rendering any of said terminals selectable, and means for operating said selector in its first movement to find a group containing a selectable terminal and thereupon to connect with said call receiving device and in its second movement to find a selectable terminal in that group and thereupon to disconnect said call receiving device.

6. In a telephone exchange system, a plurality of terminating lines, operators' positions, a telephone set and a group of connecting circuits at each of said positions, means for automatically connecting a calling line to an idle one of said telephone sets, and means for subsequently extending said line to an idle connecting circuit associated with said telephone set.

7. In a telephone exchange system, a plurality of terminating lines, operators' positions, a telephone set and a group of connecting circuits at each of said positions, means for automatically connecting a calling line to the telephone set of an idle operator's position and other means for subsequently connecting said line with an idle connecting circuit at said position.

8. In a telephone exchange system, an operator selector switch, a plurality of groups of connecting circuits terminating thereon, an operator's telephone set individual to each of said groups, a calling line, means for extending said line to said switch, and means for operating said switch to select the group of an idle operator and simultaneously to connect said line with the telephone set of said operator.

9. In a telephone exchange system, a plurality of terminating lines, operators' positions, a telephone set and a group of connecting circuits at each of said positions, means for establishing a preliminary connection between a calling line and a telephone set at an idle operator's position, and means for subsequently connecting said line to an idle connecting circuit at said position, connecting said telephone set thereto, and breaking said preliminary connection.

10. In a telephone exchange system, an automatic switch comprising a plurality of groups of stationary contact points, a plurality of connecting circuits terminating thereon, a set of movable contact members individual to each of said groups, tripping means for bringing any of said sets into operative engagement with its corresponding group, an operator's telephone set associated with said group, a calling line connection extended to said switch, and contact members carried on said tripping means for completing a temporary connection between said calling line and said operator's set.

11. In a telephone exchange system, an automatic switch, a plurality of groups of connecting circuits terminating thereon, an operator's telephone set individual to each of said groups, a plurality of sets of contact brushes normally held in non-contacting position, a calling line extended thereto, a brush tripping shaft with projecting members spirally positioned thereon and rotatable to bring any of said members into position for releasing a corresponding set of contact brushes, and contact members carried on said shaft for simultaneously completing a connection between said calling line and the telephone set of an idle operator and selecting the group of connecting circuits individual thereto.

12. In all automatic call distributing system, a plurality of lines, line finder switches, connecting circuit finder switches connected thereto, operators' positions, connecting circuits available at said positions and terminating on said connecting circuit finder switches, and means for establishing a preliminary conversational connection between a calling line and an idle operator upon the selection of said operator's position and prior to the selection of an idle connecting circuit at said position.

13. In a telephone exchange system, a line finder switch comprising a group selecting mechanism and a line selecting mechanism, a plurality of lines terminating in groups on said switch, circuit closing means rendered active by a calling line and carried by said group selector for selecting the group including said line, a connecting circuit finder switch, means for extending said calling line thereto, a plurality of groups of connecting circuits terminating thereon, an operator's telephone set individual to each of said groups, and means for selecting the group individual to an idle operator and simultaneously closing a temporary by-path to said operator's telephone set prior to the selection of an idle connecting circuit in said group.

14. In a telephone exchange system, connecting circuit finder switches, operators' positions, line finder switches for automatically extending calling lines to said connecting circuit finder switches, connecting circuits terminating in groups on said connecting circuit finder switches and selectable thereby, an operator's telephone set individual to each of said groups, an operator finder switch for each of said connecting circuit finder switches for establishing a preliminary conversational connection between a calling line and an idle operator, said connecting circuit finder switch subsequently connecting said line to an idle connecting circuit, and means for connecting said operator's set to said connecting circuit and breaking said preliminary connection.

15. In a telephone exchange system, the combination with lines, operators' positions, automatic switching apparatus, and means for extending connections through said apparatus between said line and positions, of means common to said positions and controllable from any one thereof for indicating the identity of a connected line.

16. In a telephone exchange system, the combination with lines, operators' positions, connecting circuits at said positions, means for automatically extending connection between any of the connecting circuits of any of said positions, and any of said lines, of an identifying signal individual to each line, and means at each operator's position for actuating the signal of any line connected thereto.

17. In a telephone exchange system, the combination with lines, operators' positions and automatic means for distributively connecting calling lines to said positions, of means common to said positions and controllable from any one thereof for indicating the identity of a line engaged at that position.

18. In a telephone exchange system, the combination with subscribers' lines, operators' positions, a plurality of connecting circuits apportioned to said positions, and automatic means for distributively connecting calling lines to said connecting circuits, of an indicating signal for each subscribers' line, and means at each position for actuating the signal of a calling line connected to any connecting circuit of that position.

19. In an automatic call distributing system, a plurality of lines, operators' positions, an indicating signal individual to each of said lines and common to said operators' positions, and controllable at any time by the operator thereat, means at each of said positions for causing at any time the display of the signal of a line engaged at said position.

20. In a telephone exchange system, lines, operators' positions, connecting circuits at said positions, means for automatically extending a calling line to an idle connecting circuit at an idle operator's position, an identifying signal individual to said line, and means at said operator's position for actuating said signal.

21. In a telephone exchange system, lines, operators' position, connecting circuits at said positions, means for automatically extending a calling line to an idle connecting circuit at an idle operator's position, an identifying signal individual to said line, and means associated with said connecting circuit and controllable at said operator's position for displaying said signal.

22. In a telephone exchange system, lines, a plurality of operators' positions, an indicating mechanism common thereto and comprising a displayable signal individual to each of said lines, connecting circuits at said operators' positions, means for automatically extending a calling line to an idle connecting circuit at an idle operator's position, and means at said position for controlling the signal individual to said calling line.

23. In a telephone exchange system, the combination with line terminals, automatic switches and a connection to any of said line terminals established serially through and by means of a plurality of said switches of means controllable over said connection for producing at will a busy or free test condition at the connected line terminal.

24. In a telephone exchange system, a plurality of lines, operators' positions, an automatic switch for extending a connection from a calling line to an operator's position, and means controllable from said position over contacts closed by said switch for rendering said line available for other connections while continuing the connection already established.

25. In a telephone exchange system, a plurality of lines, operators' positions, line finder switches, connecting circuit finder switches, a calling line automatically extended to an idle operator's position through a line finder switch and a connecting circuit finder switch, a cutoff relay individual to said line and having its circuit carried through said line finder switch and said connecting circuit finder switch to said operator's position, and a key at said position for releasing said relay.

26. In a telephone exchange system, a plurality of operators' positions, a line finder switch and a connecting circuit finder switch for automatically connecting a calling line with an idle operator, a control circuit extended through said switches, and a switch in said circuit whereby the operator may render said line available for other connections while continuing the connection already established.

27. In a telephone evchange system, connecting circuit finder switches, a plurality of lines terminating thereon, operators' positions, line finder switches for automatically extending calling lines to said connecting circuit finder switches, connecting circuits terminating in groups on said connecting circuit finder switches and selectable thereby, an operator's telephone set individual to each of said groups, means on said connecting circuit finder switches for establishing a preliminary conversational connection between a calling line and an idle operator, means for subsequently connecting said line to an idle connecting circuit, connecting said operator's set thereto and breaking said preliminary connection, an identifying signal individual to said line, a cutoff relay for removing busy potential from the terminals of said line, and keys within the control of said operator for actuating said signal and releasing said cutoff relay.

28. In a telephone exchange system, connecting circuit finder switches, operators' positions, line finder switches for automatically extending calling lines to said connecting circuit finder switches, connecting circuits terminating in groups on said connecting circuit finder switches and selectable thereby, an operator's telephone set individual to each of said groups, an operator finder switch for each of said connecting circuit finder switches for establishing a preliminary conversational connection between a calling line and an idle operator, said connecting circuit finder switch subsequently connecting said line to an idle connecting circuit, means for connecting said operator's set to said connecting circuit and breaking said preliminary connection, an identifying signal individual to said line, a cutoff relay likewise individual to said line, and control circuits for said signal and said relay extending through said line finder switch and said operator finder switch and controllable by said operator.

29. The combination with a finder switch having movable brushes and a plurality of stationary terminals, of a connecting circuit extending to said movable brushes, a plurality of lines extending to said stationary terminals, a plurality of line identifying means associated with each line, and apparatus associated with said connecting circuit and adapted for selective cooperation with said different identifying means.

30. The combination with a telephone line, of switch controlling means, a line identifying device, a relay for bringing said means and device alternatively into operative relation with said line, a finder switch for making connection with said line, motor mechanism for driving said switch, switch stopping mechanism responsive to the aforesaid controlling means, and apparatus associated with said switch and adapted to cooperate with said identifying device.

31. The combination with a finder switch having movable brushes and a plurality of stationary terminals, of a connecting circuit extending to said movable brushes, a plurality of lines extending to said stationary terminals, a plurality of line identifying means associated with each line, a relay for each line adapted to control the operative connection with said line of one or another of said identifying means, and apparatus associated with said connecting circuit and adapted for selective cooperation with the different identifying means of a connected line.

32. The combination with a finder switch having movable brushes and a plurality of stationary terminals, of a connecting circuit extending to said movable brushes, a plurality of lines extending to said stationary terminals, means for identifying each line with respect to a special characteristic, means for identifying each line as a calling line, a line relay for each line for operatively associating therewith one or the other of said identifying means, mechanism associated with said connecting circuit for controlling the movement of said finder switch, said mechanism being responsive to said calling line identifying means, and apparatus associated with said connecting circuit and adapted to cooperate with said special characteristic identifying means.

33. The combination with a telephone line, of a plurality of identifying means associated therewith, a connecting circuit, a plurality of devices associated with said circuit for cooperating with said plurality of identifying means of a connected line, and switching mechanism adapted to associate the various devices and the corresponding identifying means with each other in different stages of the operation.

34. The combination with a telephone line having an associated identifying conductor, of two identifying means arranged for alternative association with said identifying conductor, a switch for controlling said alternative association of said different means with said conductor, a connecting circuit adapted to be extended to said line and having a conductor for completing the circuit of said identifying conductor, and two devices adapted to be brought alternatively into operative relation with said last-mentioned conductor, and each adapted to cooperate with a different one of said identifying means.

35. The combination with a telephone line having a line terminal and an associated local terminal, of a line relay, a local conductor terminating on said local terminal and having two branches of different electrical characteristics alternatively closed by said line relay, finder switch brushes adapted to engage said terminals, means for controlling the movement of said finder switch brushes responsive to the closure of a particular one of said branches, mechanism included in the other branch, and apparatus associated with said switch brushes adapted to cooperate with said mechanism when the corresponding branch is closed.

36. The combination with a finder switch having movable brushes and a plurality of sets of stationary terminals adapted to be engaged thereby, of a connecting circuit connected with said movable brushes, a plurality of lines connected with said plurality of sets of stationary terminals, an identifying conductor associated with each line and connected with one terminal of the corresponding set, each identifying conductor having two branches, means associated with each line for closing one of said branches in the act of calling, means associated with said switch and responsive to the closure of said branch for stopping the brushes in engagement with the corresponding line terminals, means made operative in the engagement of the brushes with said terminals for closing said other branch of the identifying conductor, and line identifying mechanism adapted to be controlled over said last-mentioned branch.

37. In a telephone system, the combination with a plurality of lines, an operator's position and means for automatically extending the circuit of any one of said lines to said position, of electrically actuated apparatus for giving a different signal indication for each of said lines, means associated with each line for rendering said apparatus operable upon the extension of the line to produce the signal indication corresponding to said line, and operator controlled means for effecting the operation of said apparatus to produce the signal indication corresponding to the extended line.

38. In a telephone system, the combination with a plurality of lines, an operator's position and an extension circuit for extending any one of said lines to said position, of normally inactive apparatus for indicating the identity of an extended line, and means controllable at any time by the operator to render said apparatus active.

39. In a telephone system, the combination with a plurality of lines, an operator's position and an extension circuit for extending any one of said lines to said position, of normally inactive apparatus adapted to give a different signal indication for each of said lines, and means controllable by an operator to render said apparatus active to give the signal indication corresponding to an extended line.

40. In a telephone system, the combination with a plurality of lines, an operator's position and an extension circuit for extending any one of said lines to said position, of normally inactive apparatus for indicating the identity of an extended line, means for connecting said extended line with another line, and means operable at will during the continuance of said connection for rendering said identifying apparatus active.

41. In a telephone system, the combination with a plurality of lines, of means for extending any one of said lines to an operator's position and there connecting it with another of said lines, normally inactive apparatus adapted to give a different signal indication for each line which may be extended to said operator's position, and means operable at will during the continuance of a connection for making said apparatus active to give the signal indication corresponding to the extended line.

42. In a telephone system, the combination with a plurality of lines, an operator's position, a connecting circuit for extending the circuit of any one of said lines to said position and there connecting it to another of said lines, of apparatus for giving a different signal indication for each of said lines the circuit of which may be extended, and means associated with said connecting circuit for rendering said apparatus active to give its signal indication at any time during the continuance of said connection.

43. The combination with an operator's position, of a plurality of connecting circuits therefor, a switch for extending calls to said position, said switch being adapted to select said position and then one of the connecting circuits thereof, a signal at said position, and means made operative upon the selection of said position for operating said signal.

44. The combination with an operator's position, of a plurality of connecting circuits therefor, a switch for extending calls to said position, said switch being adapted to select said position and then one of the connecting circuits thereof, a signal at said position, means made operative upon the selection of said position for operating said signal, and means actuated upon the selection of a connecting circuit for withdrawing said signal.

45. The combination with an operator's position, of a plurality of connecting circuits therefor, a switch for extending calls to said position, said switch being adapted first to select said position and then one of the connecting circuits thereof, a common calling signal at said position, an individual calling sgnal for each of said connecting circuits, means made operative upon the selection of said position for operating said common signal, and means actuated upon the selection of a connecting circuit for operating the individual calling signal of the circuit and withdrawing said common signal.

46. The combination with a plurality of connecting circuits divided into groups, of a plurality of finder switches for making connection therewith, means for causing a finder switch to select a particular group of circuits, and means for preventing another finder switch from selecting said group until after the first switch establishes connection with one of the circuits of said group.

47. The combination with an operator's position, of a group of connecting circuits at said position, means for extending calls to said connecting circuits, an automatic listening key for each circuit, means responsive to the extending of a call to one of said circuits for operating the associated listening key, and means for preventing the extension of a call to any other of said connecting circuits while the listening key of one of said circuits is operated.

In witness whereof, we hereunto subscribe our names this 31 day of March, 1919.

EDWARD B. CRAFT.
JOHN NEWBERRY REYNOLDS.